United States Patent
Canchi et al.

(10) Patent No.: US 8,976,480 B1
(45) Date of Patent: Mar. 10, 2015

(54) METHOD TO CONVERT AND CALIBRATE THE EMBEDDED CONTACT SENSOR SIGNAL TO CLEARANCE AND SPACING INFORMATION USING INTERFACE VOLTAGE CONTROL

(71) Applicant: HGST Netherlands B.V., Amsterdam (NL)

(72) Inventors: Sripathi Vangipuram Canchi, San Jose, CA (US); Saurabh Deoras, Milpitas, CA (US); Remmelt Pit, Menlo Park, CA (US); Erhard Schreck, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/058,686

(22) Filed: Oct. 21, 2013

(51) Int. Cl.
  G11B 21/02 (2006.01)
  G11B 27/36 (2006.01)
  G11B 5/60 (2006.01)
(52) U.S. Cl.
  CPC ............................ G11B 5/607 (2013.01)
  USPC ................................. 360/75; 360/31
(58) Field of Classification Search
  None
  See application file for complete search history.

(56) References Cited

U.S. PATENT DOCUMENTS

| | | | |
|---|---|---|---|
| 7,321,476 B2 * | 1/2008 | Baumgart et al. | 360/25 |
| 7,796,356 B1 | 9/2010 | Fowler et al. | |
| 7,974,039 B1 | 7/2011 | Xu et al. | |
| 7,982,987 B2 | 7/2011 | Deng et al. | |
| 8,059,357 B1 | 11/2011 | Knigge et al. | |
| 8,335,053 B2 | 12/2012 | Chen et al. | |
| 2003/0043491 A1 * | 3/2003 | Riddering et al. | 360/69 |
| 2012/0099218 A1 | 4/2012 | Kurita et al. | |
| 2012/0120519 A1 | 5/2012 | Kunkel et al. | |
| 2012/0120521 A1 | 5/2012 | Kurita et al. | |
| 2012/0262816 A1 | 10/2012 | Tanaka et al. | |
| 2013/0044387 A1 | 2/2013 | Marchon et al. | |
| 2013/0063834 A1 * | 3/2013 | Hanchi et al. | 360/31 |
| 2013/0094104 A1 | 4/2013 | Ngan et al. | |

OTHER PUBLICATIONS

Ryouji Kobayashi et al.; "HDI Technology for Perpendicular Magnetic Recording Media"; Issue: Magnetic Recording Media, vol. 57 No. 2, May 2011, 7 pages.

* cited by examiner

*Primary Examiner* — Andrew L Sniezek
(74) *Attorney, Agent, or Firm* — Patterson & Sheridan, LLP

(57) ABSTRACT

Embodiments of the present invention generally relate to a method for obtaining head/disk clearance based on ECS signal. The ECS is calibrated by applying different interface voltages to cause changes in the head/disk clearance, the ECS signal at each interface voltage is obtained, and the relationship between the change in head/disk clearance and the ECS signal is calculated. From this relationship, the head/disk clearance may be obtained based on ECS signal.

22 Claims, 6 Drawing Sheets

METHOD TO CONVERT AND CALIBRATE THE EMBEDDED CONTACT SENSOR SIGNAL TO CLEARANCE AND SPACING INFORMATION USING INTERFACE VOLTAGE CONTROL

BACKGROUND

1. Field

Embodiments of the present invention generally relate to magnetic recording heads, and more particularly, to methods of calibrating an embedded contact sensor (ECS) disposed in magnetic recording heads.

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider towards the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

In typical systems, recession is created after lapping and pre-carbon etching processes. This creates a distance between the transducers and the disk surface. Thermal fly-height control (TFC) is a method of altering this distance between the transducers and the disk surface by heating the components of the reader/writer causing thermal expansion of the materials, which results in the reader/writer transducers protruding closer to the surface of the hard disk. The transducers are moved closer to the disk surface to enable proper reading and writing of the tracks.

In some systems, the magnetic head includes an ECS which is embedded in a layer of alumina (the alumina provides electrical isolation for the ECS). The ECS typically is constructed of a resistive film which detects contact through a change in resistance based on a change in temperature. Because the ECS is a heat sensor, applying different TFC power to adjust the distance between the transducers and the disk surface affects the ECS signal. Therefore, there is a need for an improved method to calibrate the ECS.

SUMMARY OF THE INVENTION

Embodiments of the present invention generally relate to a method for obtaining head/disk clearance based on ECS signal. The ECS is calibrated by applying different interface voltages to cause changes in the head/disk clearance, the ECS signal at each interface voltage is obtained, and the relationship between the change in head/disk clearance and the ECS signal is calculated. From this relationship, the head/disk clearance may be obtained based on ECS signal.

In one embodiment, a method for calibrating and utilizing an ECS is disclosed. The method comprises applying a plurality of interface voltages to cause a plurality of changes in a head/disk clearance, calculating each of the plurality of changes in the head/disk clearance, obtaining an ECS signal at each of the plurality of interface voltage, and calculating a relationship between the change in the head/disk clearance and the ECS signal.

In another embodiment, a method for calibrating and utilizing an ECS is disclosed. The method comprises applying a plurality of interface voltages to cause a plurality of changes in a head/disk clearance, calculating each of the plurality of changes in the head/disk clearance, calculating a relationship between the change in the head/disk clearance and the interface voltage, obtaining an ECS signal at each of the plurality of interface voltages, calculating a relationship between the ECS signal and the interface voltage, and calculating a relationship between the change in the head/disk clearance and the ECS signal.

In another embodiment, a method for calibrating and utilizing an ECS is disclosed. The method comprises applying a plurality of power levels to a TFC element and a plurality of interface voltages to cause a plurality of changes in a head/disk clearance, calculating each of the plurality of changes in the head/disk clearance, obtaining an ECS signal at each power level and interface voltage, calculating a relationship between the change in head/disk clearance and the ECS signal, and adjusting the interface voltage and/or the TFC power level based on the ECS signal to maintain a predetermined head/disk clearance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention generally relate to a method for obtaining head/disk clearance based on ECS signal. The ECS is calibrated by applying different interface voltages to cause changes in the head/disk clearance, the ECS signal at each interface voltage is obtained, and the relationship between the change in head/disk clearance and the ECS signal is calculated. From this relationship, the head/disk clearance may be obtained based on ECS signal.

Figure 1:
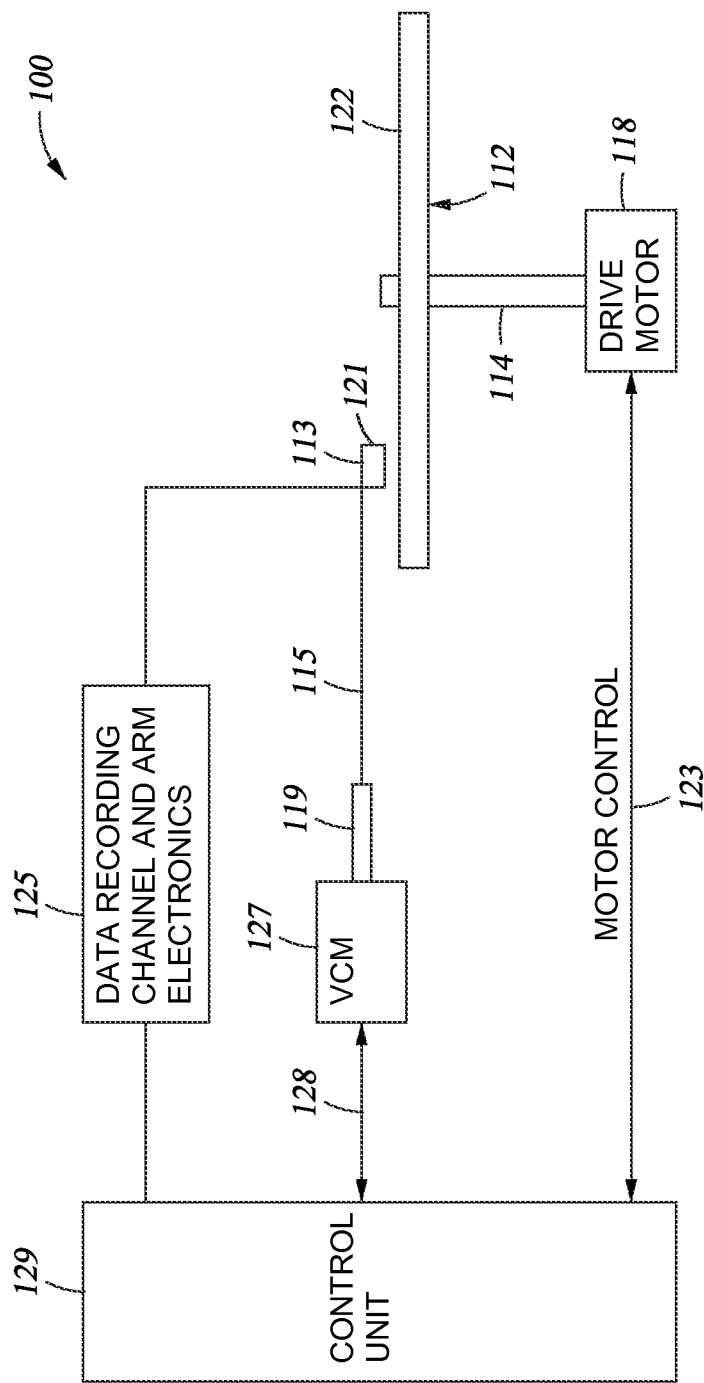
FIG. 1 illustrates a disk drive system, according to embodiments of the invention.

FIG. 1 illustrates a disk drive 100 embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases slider 113 towards the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 slightly above the disk 112 surface by a small spacing, or a head/disk clearance, during normal operation.

The various components of the disk storage system are controlled in operation by control signals generated by control unit 129, such as access control signals and internal clock signals. Typically, the control unit 129 includes logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
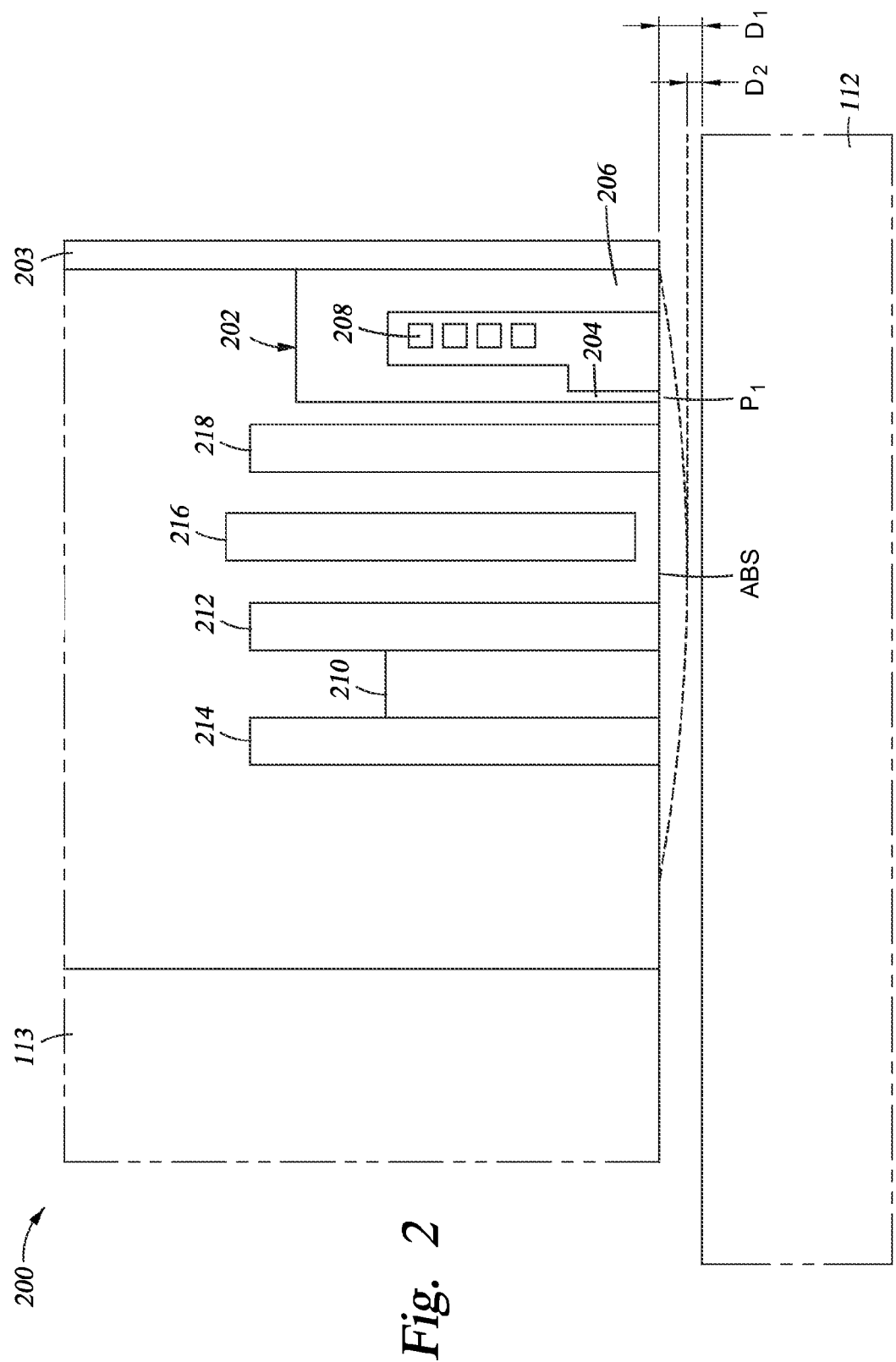
FIG. 2 illustrates a cross-sectional schematic diagram of a magnetic head of the disk drive, according to one embodiment of the invention.

FIG. 2 illustrates a cross-sectional schematic diagram of a magnetic head 200 of the disk drive 100, according to one embodiment of the invention. The magnetic head 200 includes a magnetic write head 202 that may include a magnetic write pole 204, a magnetic return pole 206 and an electrically conductive write coil 208. A non-magnetic, electrically insulating protective coating such as alumina 203 may be formed over the top of the write head 202. The magnetic head 200 also includes a magnetic sensor 210 for reading a magnetic signal from the magnetic disk 112. The read sensor 210 may be sandwiched between first and second magnetic shields 212, 214. The magnetic head 200 may also include a TFC element 216 that functions as a thermal actuator. The TFC element 216 may be recessed from an ABS as shown in FIG. 2, or may be extending to the ABS. The magnetic head 200 further includes an ECS 218 that functions to detect contact between the magnetic head 200 and the magnetic disk 112. When no power is applied to the TFC element 216, the distance between the magnetic head 200 and the magnetic disk 112, also known as the head/disk clearance, is indicated by D1. To help achieving higher areal densities in the disk drive 100, the head/disk clearance may be reduced. One method of reducing the head/disk clearance is to utilize the TFC element 216. When power is applied to the TFC element 216, heat from the TFC element 216 protrudes the read sensor 210 and the write head 202 toward the magnetic disk 112, forming a protrusion as indicated by P1. The magnetic head 200 with the protrusion has a reduced head/disk clearance, as indicated by D2. However, too much power applied to the TFC element 216 may cause a contact between the magnetic head 200 and the magnetic disk 112, also known as a touchdown (TD). Once there is a TD, the area on the magnetic disk 112 where the contacting took place may not be used for storing data and may be damaged causing loss of data. Additionally, unintended contact may cause damage to the read/write head. To control the head/disk clearance with a minimum number of TDs, a relationship between signal from the ECS 218 and the head/disk clearance is calculated. The ECS 218 is sensitive to the head/disk clearance because the air bearing cooling depends on the clearance and hence affects the temperature of the temperature sensitive ECS.

To convert the ECS signal to head/disk clearance, one may perform a TD, and then obtain the ECS signal at different head/disk clearances as the power applied to the TFC element 216 reduces. However, since the ECS 218 is a heat sensor, the ECS signal change is dominated by the change in the power applied to the TFC element 216, instead of by the change in the head/disk clearance. Thus, it is difficult to calibrate the ECS 218 by varying the power applied to the TFC element 216 to change the head/disk clearance.

Figure 3:
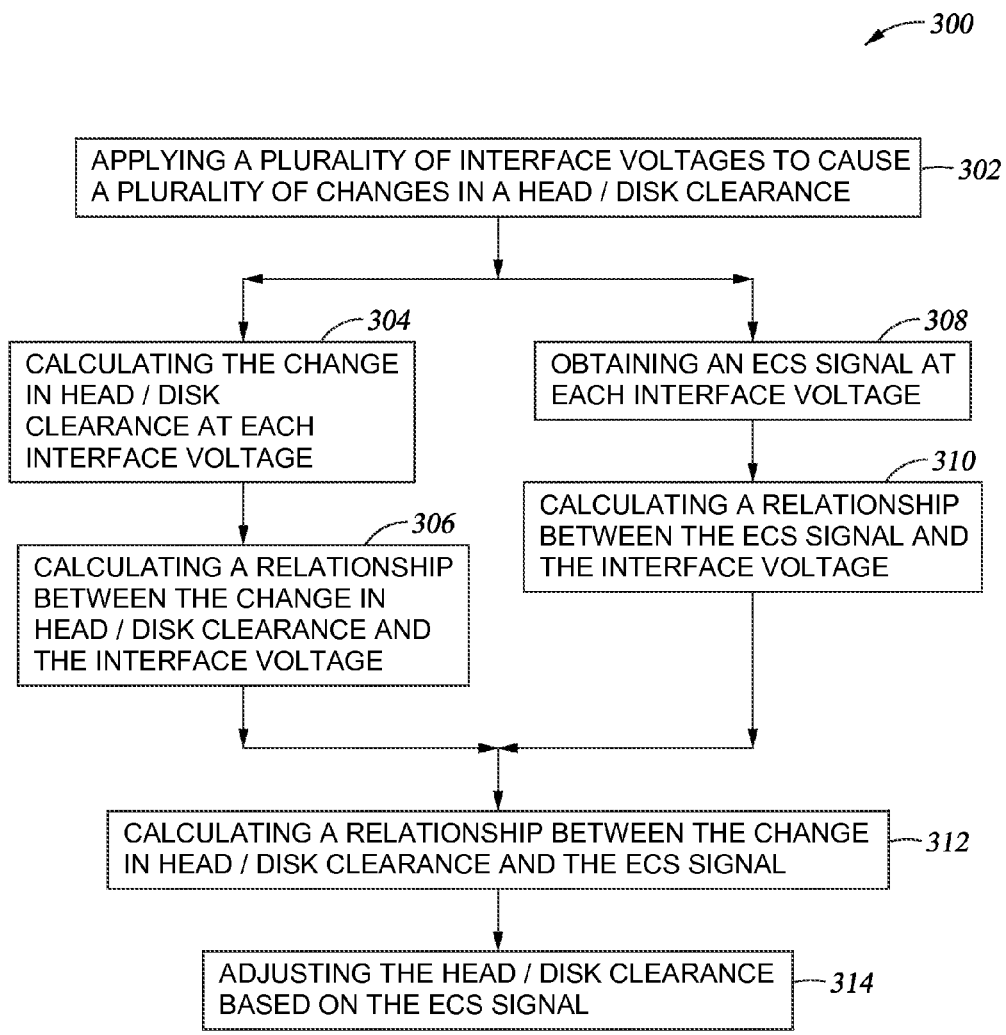
FIG. 3 illustrates a method for calibrating an ECS, according to one embodiment of the invention.

FIG. 3 illustrates a method 300 for calibrating the ECS 218 that is independent of the power applied to the TFC element 216. At step 302, a plurality of interface voltages to bias the slider 113 relative to the magnetic disk 112 are applied. The interface voltages applied cause a coulomb attraction and affect the spacing between the magnetic head 200 and the disk 112. The plurality of interface voltages may cause a plurality of changes in the head/disk clearance. The interface voltages may be applied to the disk 112 or to the magnetic head 200, and may have a range between −1 V to 1 V. Next, at step 304, the change in head/disk clearance for each interface voltage applied to the disk 112 is calculated. The calculation may be based on any suitable technique, such as techniques based on Wallace Spacing Loss relationship, where the change in amplitude of the measured read-back signal harmonics directly relate to the head/disk clearance change. If a TD is performed, the actual head/disk clearance may be obtained.

Figure 4:
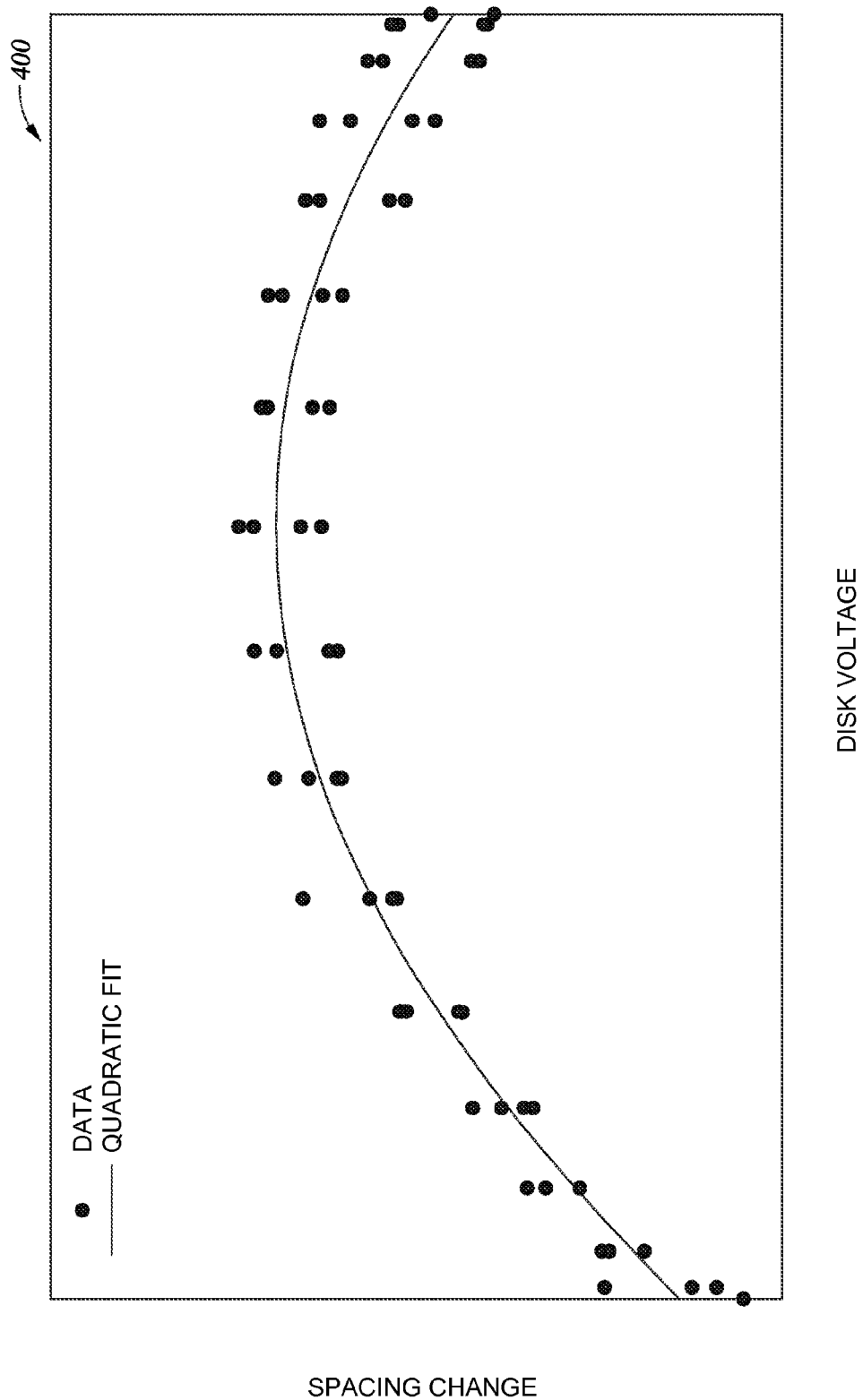
FIG. 4 is a chart showing a relationship between head/disk clearance and interface voltage applied to a magnetic disk, according to one embodiment of the invention.

At step 306, a relationship between the change in head/disk clearance and the interface voltage is calculated. FIG. 4 is a chart 400 illustrating the relationship. The interface voltages are applied to the magnetic disk 112. For each data point, the power applied to the TFC element 216 remains constant. The relationship between the change in head/disk clearance and the interface voltage applied to the disk 112 may change if the power applied to the TFC element 216 changes.

Figure 5:
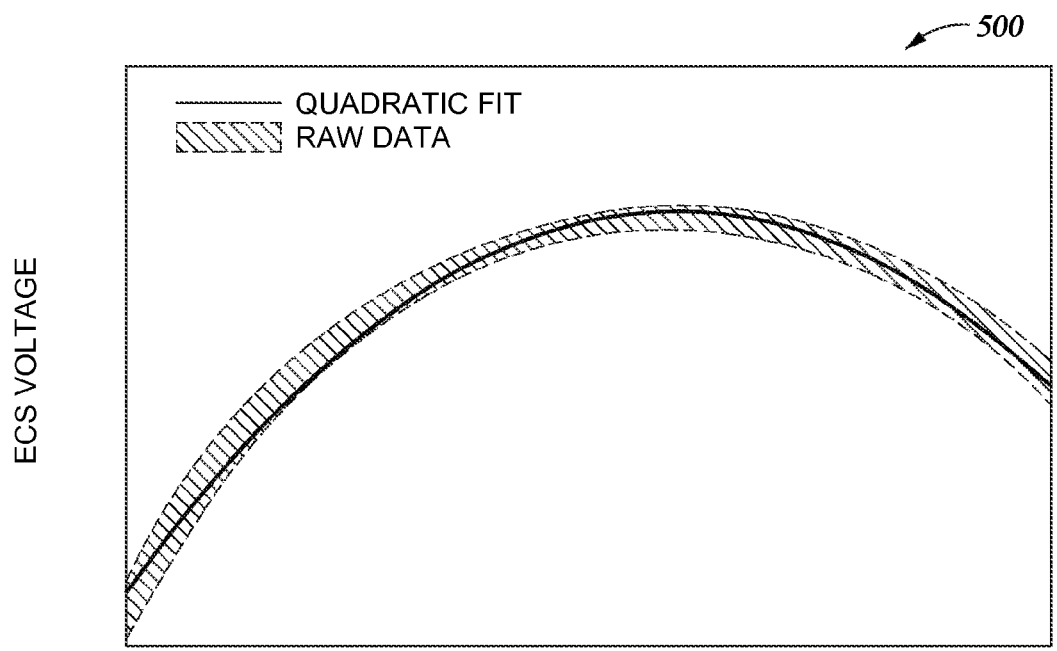
FIG. 5 is a chart showing a relationship between ECS signal and interface voltage applied to the magnetic disk, according to one embodiment of the invention.

At step 308, an ECS signal at each interface voltage is obtained. The ECS signals may be obtained by any suitable electronics/preamp that is onboard the disk drive 100. In one embodiment, the ECS signals are obtained by arm electronics 125. At step 310, a relationship between ECS signal and the interface voltage is calculated. The relationship is illustrated in chart 500, as shown in FIG. 5. Again the relationship between ECS signal and the interface voltage applied to the disk 112 may change if the power applied to the TFC element 216 changes.

Figure 6:
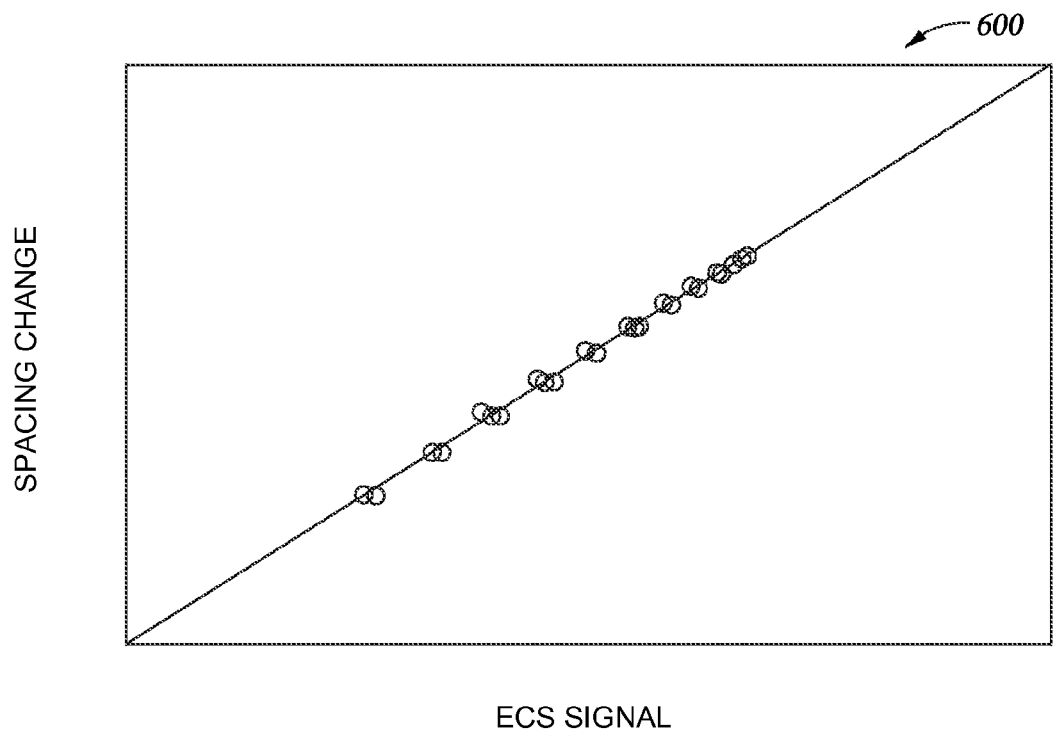
FIG. 6 is a chart showing a relationship between head/disk clearance and ECS signal, according to one embodiment of the invention.

After calculating the relation between the change in head/disk clearance and the interface voltage and the relationship between the ECS signal and the interface voltage, the relationship between ECS signal and change in head/disk clearance may be calculated, as described in step 312. The relationship between ECS signal and head/disk clearance at a particular TFC power is shown in chart 600, as shown in FIG. 6. The power applied to the TFC element 216 when obtaining the data points is at 30 mW, and at this TFC power, head/disk clearance and ECS signal have a linear relationship. The relationship may not be linear as the power applied to the TFC element 216 changes.

The steps 302-312 are performed to calibrate the ECS 218. The calibration may be performed at any operating condition, such as radial location of the disk or TFC operating condition, and the result of the calibration (i.e., the relationship between the head/disk clearance and ECS signal) may be used in many applications. In one embodiment, a single TD measurement on any track may be performed to obtain ECS signal and actual head/disk clearance information on that track. The actual head/disk clearance at neighboring radius/track locations may be obtained by monitoring the changes in ECS signal, even without performing a TD at the neighboring tracks. The head/disk clearance at neighboring radius/track locations may be adjusted based on the ECS signal. In one embodiment, when performing a seek process, any changes in head/disk clearance are readily available by monitoring how the ECS signal changes during the seek process. Accurate knowledge of how the ECS signal change relates to the head/disk clearance change allows accurate TFC, or other technique, compensation. In one embodiment, the re-measuring of the head/disk clearance on the field with a minimum number of TDs may be achieved. Since the ECS signal is insensitive to offtrack motions of the head, using ECS signal to accurately predict head/disk clearance is an advantage over using other magnetic read-back based methods that require accurate track following for head/disk clearance monitoring since magnetic read-back based methods are sensitive to offtrack motions.

After calibrating the ECS 218, the head/disk clearance may be adjusted during operation based on the ECS signal, as shown in step 314. As the ECS signal indicates a reduction in the head/disk clearance, the head/disk clearance may be increased by any suitable method to avoid a contact between the head 200 and the disk 112. In one embodiment, the head/disk clearance is increased by reducing the power applied to the TFC element 216.

Figure 7:
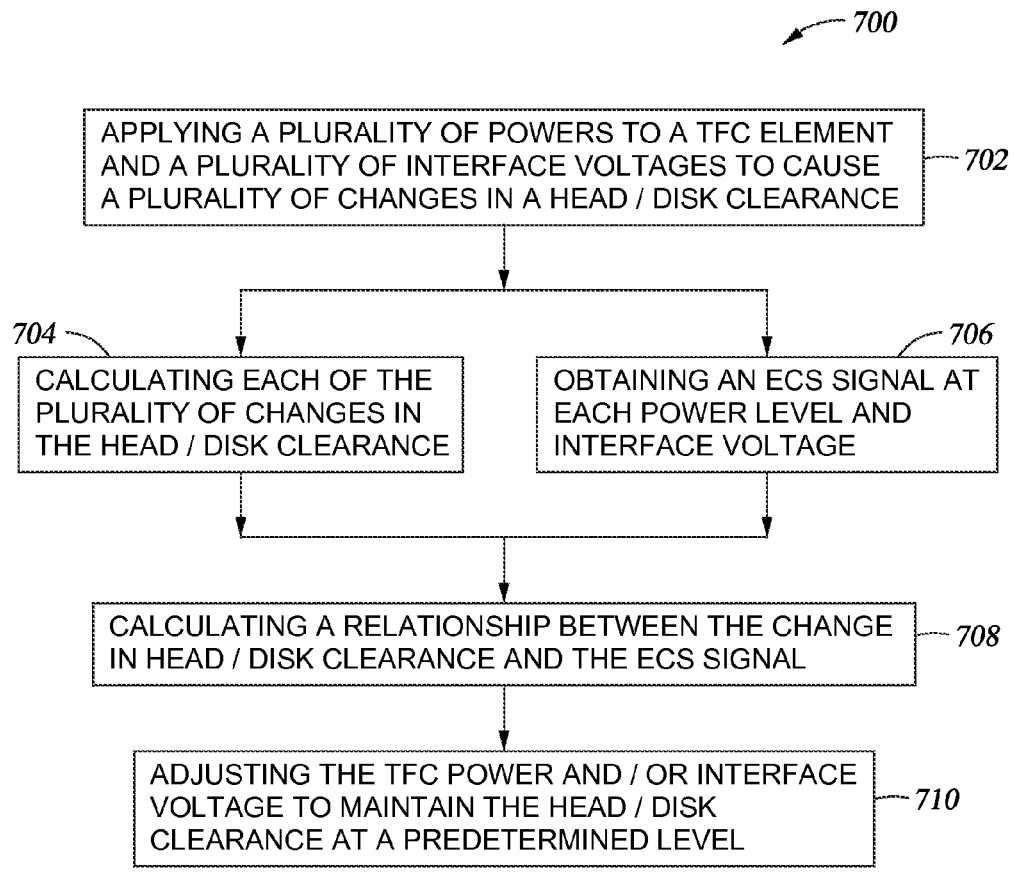
FIG. 7 illustrates a method for maintaining head/disk clearance during operation, according to one embodiment of the invention.

The method 300 provides a method to calibrate the ECS 218, so head/disk clearance may be adjusted by TFC or other technique based on the ECS signal. The method 300 may be referred to as a feed forward mode. There may be a method relating to a feedback mode that implements multiple inputs (e.g., TFC power, ECS signal, interface voltage) to estimate a single output (e.g., head/disk clearance). FIG. 7 illustrates this feedback mode method 700 that is used to maintain the head/disk clearance.

At step 702, a plurality of power levels are applied to a TFC element 216 and a plurality of interface voltages are applied to cause a plurality of changes in a head/disk clearance. The interface voltages may be applied to the disk 112 or to the magnetic head 200. At step 704, the change in head/disk clearance for each TFC power level and each interface voltage is calculated. The calculation may be based on any suitable technique, such as techniques based on Wallace Spacing Loss relationship, where the change in amplitude of the measured read-back signal harmonics directly relate to the head/disk clearance change. The read-back signal may be from one written track. The head/disk clearance is a function of the TFC power and the interface voltage. At step 706, the ECS signal at each TFC power level and each interface voltage is obtained. The ECS signal is a function of the TFC power and the interface voltage. Since both the change in the head/disk clearance and the ECS signal are functions of the TFC power and interface voltage, a relationship between the head/disk clearance and the ECS signal is calculated, as shown in step 708. Through this relationship, the head/disk clearance change is indicated by the ECS signal. Thus, during operation, the change in head/disk clearance may be obtained by monitoring the ECS signal. If a TD is performed, the actual head/disk clearance may be obtained. As shown in step 710, the ECS signal is maintained at a predetermined level by adjusting the TFC power and/or the interface voltage, and as a result, the head/disk clearance is maintained at a predetermined level. The adjustment may be made on the written track from which the head/disk clearance is initially calculated during the calibration of the ECS 218. The adjustments may be made on neighboring tracks since the ECS signal is insensitive to offtrack motions.

In summary, a method for calibrating an ECS is disclosed. The head/disk clearance is changed by applying an interface voltage to either the magnetic head or the magnetic disk. The ECS signal at each head/disk clearance is obtained, thus a relationship between the ECS signal and the head/disk clearance may be calculated. This calibration method provides an accurate relationship between the ECS signal and the head/disk clearance without the noise introduced by a TFC power. During operation, the ECS is utilized for controlling the head/disk clearance. With this method, the number of TDs may be reduced.

While the foregoing is directed to embodiments of the present invention, other and further embodiments of the invention may be devised without departing from the basic scope thereof, and the scope thereof is determined by the claims that follow.

What is claimed is:
1. A method for calibrating and utilizing an embedded contact sensor, comprising:
    applying a plurality of interface voltages to cause a plurality of changes in a head/disk clearance;

calculating each of the plurality of changes in the head/disk clearance, wherein a relationship of the plurality of changes in the head/disk clearance to the interface voltage forms a quadratic fit;

obtaining an embedded contact sensor signal at each of the plurality of interface voltages, wherein a relationship of the embedded contact sensor signal to each of the plurality of interface voltages forms a quadratic fit; and calculating a relationship between the change in the head/disk clearance and the embedded contact sensor signal, wherein the relationship of the change in the head/disk clearance to the embedded contact sensor signal is linear.

2. The method of claim 1, wherein the plurality of interface voltages are applied to a magnetic disk.

3. The method of claim 1, wherein the plurality of interface voltages are applied to a magnetic head.

4. The method of claim 1, further comprising applying a power to a thermal fly-height control element.

5. The method of claim 4, wherein the power applied to the thermal fly-height control element is constant.

6. The method of claim 1, further comprising adjusting the head/disk clearance based on the embedded contact sensor signal.

7. The method of claim 6, wherein the embedded contact sensor signal is obtained on a track and the adjusting the head/disk clearance is performed on neighboring tracks.

8. The method of claim 6, wherein the head/disk clearance is adjusted by changing the power applied to a thermal fly-height control element.

9. A method for calibrating and utilizing an embedded contact sensor, comprising:
   applying a plurality of interface voltages to cause a plurality of changes in a head/disk clearance;
   calculating each of the plurality of changes in the head/disk clearance;
   calculating a relationship between the change in the head/disk clearance and the interface voltage, wherein the relationship of the change in the head/disk clearance to the interface voltage forms a quadratic fit;
   obtaining an embedded contact sensor signal at each of the plurality of interface voltages;
   calculating a relationship between the embedded contact sensor signal and the interface voltage, wherein a relationship of the embedded contact sensor signal to the interface voltage forms a quadratic fit; and
   calculating a relationship between the change in the head/disk clearance and the embedded contact sensor signal, wherein the relationship of the change in the head/disk clearance to the embedded contact sensor signal is linear.

10. The method of claim 9, wherein the plurality of interface voltages are applied to a magnetic disk.

11. The method of claim 10, wherein the plurality of interface voltages are applied to a magnetic head.

12. The method of claim 10, further comprising applying a power to a thermal fly-height control element.

13. The method of claim 12, wherein the power applied to the thermal fly-height control element is constant.

14. The method of claim 9, further comprising adjusting the head/disk clearance based on the embedded contact sensor signal.

15. The method of claim 14, wherein the embedded contact sensor signal is obtained on a track and the adjusting the head/disk clearance is performed on neighboring tracks.

16. The method of claim 14, wherein the head/disk clearance is adjusted by changing the power applied to a thermal fly-height control element.

17. A method for calibrating and utilizing an ECS embedded contact sensor, comprising:
   applying a plurality of power levels to a thermal fly-height control element and a plurality of interface voltages to cause a plurality of changes in a head/disk clearance;
   calculating each of the plurality of changes in the head/disk clearance, wherein a relationship of the plurality of changes in the head/disk clearance to the interface voltage forms a quadratic fit;
   obtaining an embedded contact sensor signal at each power level and interface voltage, wherein a relationship of the embedded contact sensor signal to each power level and interface voltage forms a quadratic fit;
   calculating a relationship between the change in head/disk clearance and the embedded contact sensor signal, wherein the relationship of the change in the head/disk clearance to the embedded contact sensor signal is linear; and
   adjusting the interface voltage and/or the thermal fly-height control power level based on the embedded contact sensor signal to maintain a predetermined head/disk clearance.

18. The method of claim 17, wherein the interface voltage is applied to a magnetic disk.

19. The method of claim 17, wherein the interface voltage is applied to a magnetic head.

20. The method of claim 17, wherein the calculating each of the plurality of changes in the head/disk clearance is based on a magnetic read-back signal on a written track.

21. The method of claim 20, wherein the adjusting the interface voltage and thermal fly-height control power is performed on the written track.

22. The method of claim 20, wherein the adjusting the interface voltage and thermal fly-height control power is performed on neighboring written tracks.

* * * * *